US012524679B2

(12) United States Patent
Chen et al.

(10) Patent No.: US 12,524,679 B2
(45) Date of Patent: Jan. 13, 2026

(54) SYSTEM(S) AND METHOD(S) TO REDUCE A TRANSFERABLE SIZE OF LANGUAGE MODEL(S) TO ENABLE DECENTRALIZED LEARNING THEREOF

(71) Applicant: GOOGLE LLC, Mountain View, CA (US)

(72) Inventors: Mingqing Chen, Saratoga, CA (US); Lara McConnaughey, San Francisco, CA (US); Kaan Ege Özgün, Zurich (CH); Rajiv Mathews, Sunnyvale, CA (US); Françoise Beaufays, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 259 days.

(21) Appl. No.: 18/125,613

(22) Filed: Mar. 23, 2023

(65) Prior Publication Data

US 2024/0265269 A1 Aug. 8, 2024

Related U.S. Application Data

(60) Provisional application No. 63/443,597, filed on Feb. 6, 2023.

(51) Int. Cl.
*G06N 3/098* (2023.01)
*G06F 40/40* (2020.01)
*G06N 3/044* (2023.01)

(52) U.S. Cl.
CPC ............. *G06N 3/098* (2023.01); *G06F 40/40* (2020.01); *G06N 3/044* (2023.01)

(58) Field of Classification Search
CPC ........ G06N 3/098; G06N 3/044; G06N 3/045; G06N 3/082; G06N 3/0895; G06N 3/09;
(Continued)

(56) References Cited

U.S. PATENT DOCUMENTS

2018/0046915 A1 2/2018 Sun et al.
2020/0242514 A1* 7/2020 McMahan ................ G06N 7/01
2024/0320473 A1* 9/2024 Wang .................... H04L 9/0662

FOREIGN PATENT DOCUMENTS

WO 2021151056 7/2021

OTHER PUBLICATIONS

Expanding the Reach of Federated Learning by Reducing Client Resource Requirements, arXiv.org, Cornell University: arXiv: 1812.07210v1; Dec. 18, 2018 (Year: 2018).*

(Continued)

*Primary Examiner* — Linda Wong
(74) *Attorney, Agent, or Firm* — Gray Ice Higdon

(57) ABSTRACT

Implementations disclosed herein are directed to techniques for enabling decentralized learning of global language models (LMs). Remote processor(s) of a remote system can obtain a global LM that includes a global embedding matrix, generate a global embedding mask for the global embedding matrix using a masking technique, apply the global embedding mask to global embedding matrix to generate a sparsified global LM that includes a masked global embedding matrix that is a masked version of the global embedding matrix, transmit the sparsified global LM to computing device(s) that are participating in a given round of decentralized learning for the global language model, receive corresponding updates from the computing device(s), and cause the global LM to be updated based on the corresponding updates. By generating the global embedding mask and applying it to the global embedding matrix, the transferable size of the global LM is reduced thereby enabling decentralized learning thereof.

17 Claims, 5 Drawing Sheets

(58) Field of Classification Search
CPC ......... G06N 3/096; G06F 40/40; G06F 40/20; G06F 40/216; G06F 40/30
See application file for complete search history.

(56) References Cited

OTHER PUBLICATIONS

Federated Learning of N-gram Language Models, https://arxiv.org/abs/1910.03432, Oct. 8, 2019 (Year: 2019).*

FedBert: When federated learning meets Pre-training, https://www.researchgate.net/publication/358359946_FedBERT_When_Federated_Learning_Meets_Pre-Training, ACM transactions on Intelligent Systems and TEchnology, Feb. 2022 ( Year: 2022).*

Fjord: Fair and Accurate Federated Learning under heterogeneous targets with order dropout, arXiv:2102.13451v5, 35th Conference on Neural Information Processing Systems (NeurIPS'21), Jan. 11, 2022 (Year: 2022).*

Caldas, S. et al., "Expanding the Reach of Federated Learning by Reducing Client Resource Requirements"; arXiv.org; Cornell University: arXiv:1812.07210v1; 12 pages; dated Dec. 18, 2018.

Gupta, M. et al., "Compression of Deep Learning Models for Text: A Survey"; ACM Transactions on Knowledge Discovery from Data (TKDD); vol. 16, No. 4; retrieved from the internet: arXiv.org/pdf/2008.05221v2.pdf; 21 pages; dated Aug. 13, 2020.

Yan, B. et al., "Learning Effective and Efficient Embedding via an Adaptively-Masked Twins-based Layer"; Proceedings of the 30th ACM International Conference on Information and Knowledge Management; arXiv.org; arXiv:2108.11513v1; 5 pages; dated Aug. 24, 2021.

Mireshghallah, F. et al., "Differentially Private Model Compression"; arXiv.org. Cornell; arXiv:2206.01838v1; 17 pages; dated Jun. 3, 2022.

European Patent Office; International Search Report and Written Opinion issued in Application No. PCT/US2023/027034; 14 pages; dated Oct. 19, 2023.

Kong et al., "Variational Smoothing in Recurrent Neural Network Language Models" arXiv:1901.09296v1 [cs.CL], 10 pages, dated Jan. 27, 2019.

Gupta et al., "Compression of Deep Learning Models for Text: A Survey" arXiv:2008.05221v4 [cs.CL], 53 pages, dated Jun. 13, 2021.

"To Prune, or Not to Prune: Exploring the Efficacy of Pruning for Model Compression" ICLR, 10 pages, dated 2018.

* cited by examiner

| 200A | Masking Techniques for a Given Frequent Word |
|---|---|
| Left Aligned Mask 201A | [0.85, -0.68, 0.13, ..., 0.52, 0.00, 0.00, 0.00, ..., 0.00] |
| Randomly Aligned Mask 202A | [0.85, 0.00, 0.00, ..., 0.52, 0.00, -0.43, 0.00, ..., 0.79] |
| LTH Mask 203A | [0.85, 0.00, 0.13, ..., 0.52, 0.00, -0.43, 0.00, ..., 0.00] |

FIG. 2A

| 200B | Masking Techniques for a Given Tail Word |
|---|---|
| Left Aligned Mask 201B | [0.61, 0.42, -0.93, 0.00, ..., 0.00] |
| Randomly Aligned Mask 202B | [0.00, 0.42, 0.00, 0.55, ..., -0.71] |
| LTH Mask 203B | [0.61, 0.00, -0.93, 0.00, ..., -0.71] |

FIG. 2B

SYSTEM(S) AND METHOD(S) TO REDUCE A TRANSFERABLE SIZE OF LANGUAGE MODEL(S) TO ENABLE DECENTRALIZED LEARNING THEREOF

BACKGROUND

Decentralized learning of machine learning (ML) model(s) is an increasingly popular ML technique for updating ML model(s) due to various privacy considerations. In one common implementation of decentralized learning, an on-device ML model is stored locally on a client device of a user, and a global ML model, that is a cloud-based counterpart of the on-device ML model, is stored remotely at a remote system (e.g., a server or cluster of servers). During a given round of decentralized learning, the client device can check-in to a population of client devices that will be utilized in the given round of decentralized learning, download a global ML model or weights thereof from the remote system (e.g., to be utilized as the on-device ML model), generate an update for the weight of the global ML model based on processing instance(s) of client data locally at the client device and using the on-device ML model, and upload the update for the weight of the global ML model back to the remote system and without transmitting the instance(s) of the client device. The remote system can utilize the update received from the client device, and additional updates generated in a similar manner at additional client devices and that are received from the additional client devices, to update the weights of the global ML model.

However, for a given round of decentralized learning for updating of the global ML model, the client device and the additional client devices are only afforded a certain duration of time to perform each of the aforementioned operations. For instance, the client device and each of the additional client devices may only be afforded 10 minutes, or some other relatively short duration of time, to perform each of the aforementioned operations. In consequence, global ML models that are trained in a decentralized manner generally need to be less than a threshold size to enable the client device and the additional client devices to perform each of the aforementioned operations within the certain duration of time. Otherwise, the time consumed in downloading the global ML model or the weights thereof for utilization as the on-device ML model and/or the time consumed in uploading the update may consume too much of the certain duration of time to effectively generate the update locally at the client device. As a result, certain types of global ML models (e.g., language models (LMs), large language models (LLMs), etc.) are not conducive to being updated using decentralized learning. Accordingly, there is a need in the art for techniques that enable larger global ML models to be updated in a decentralized manner.

SUMMARY

Implementations described herein are directed to techniques for enabling decentralized learning of a global language model (LM). Remote processor(s) of a remote system can obtain a global LM that includes a global embedding matrix, generate a global embedding mask for the global embedding matrix using a masking technique, apply the global embedding mask to global embedding matrix to generate a sparsified global LM that includes a masked global embedding matrix that is a masked version of the global embedding matrix, transmit the sparsified global LM to a plurality of computing devices that are participating in a given round of decentralized learning for the global LM to cause each of the computing devices of the population to generate a corresponding update for the sparsified global LM, receive the corresponding updates from one or more of the computing devices of the population, and cause the global LM to be updated based on the corresponding updates that are received from the one or more of the computing devices of the population.

Notably, the sparsified global LM that includes the masked global embedding matrix is of a reduced size as compared to the global LM that includes the global embedding matrix in terms of trainability of the global LM and/or in terms of transferability of the global LM, and based on the sparsification of the global LM. As a result, the compression ratio of the sparsified global LM is better than the compression ratio of the global LM. This achieves various technical advantages. For instance, the transmitting of the sparsified global LM to the computing device consumes less network resources and reduces a quantity of time needed for the computing devices to download the sparsified global LM during the given round of decentralized learning since less bytes need to be transferred in the transmitting. Similarly, the receiving of the corresponding updates at the remote system also consumes less network resources and reduces a quantity of time needed for the computing devices to upload the corresponding updates during the given round of decentralized learning since less bytes need to be transferred in the receiving. Accordingly, techniques described herein enable larger LMs, such as language models, such as recurrent neural network-based (RNN-based) LMs, transformer-based large LMs (LLMs), conformer-based LMs, and/or other LMs to be updated in a decentralized manner. Moreover, the global LM can be updated in the decentralized manner and using the sparsified LM as described herein without sacrificing precision and/or recall.

As used herein, a "round of decentralized learning" may be initiated when the remote processor(s) identify a population of computing devices that have checked-in for decentralized learning, or when the remote processor(s) transmit data to a population of computing devices for purposes of updating a global LM. The data that is transmitted to the population of computing devices for purposes of updating the global LM may include, for example, global weights of the global LM, data that may be processed by the computing devices of the population in generating the corresponding updates (e.g., audio data, vision data, textual data, etc.), and/or any other data. Further, the round of decentralized data may be concluded when the remote processor(s) receive the corresponding updates from the computing devices, or when the remote processor(s) cause the global weights of the global LM to be updated based on the corresponding updates. Notably, the remote processor(s) may cause the global weights of the global LM to be updated based on one or more criteria. The one or more criteria may include, for example, a threshold quantity of corresponding updates being received from one or more of the computing devices of the population, a threshold quantity of time lapsing since the round of decentralized learning was initiated (e.g., 5 minutes, 10 minutes, 15 minutes, 60 minutes, etc.), and/or other criteria.

The above description is provided as an overview of some implementations of the present disclosure. Further description of those implementations, and other implementations, are described in more detail below.

BRIEF DESCRIPTION OF THE DRAWINGS

FIG. 2A and FIG. 2B depict tables that include various masking techniques that may be utilized to generate a global embedding mask for a global embedding matrix of a global language model (LM), in accordance with various implementations.

DETAILED DESCRIPTION

Figure 1:
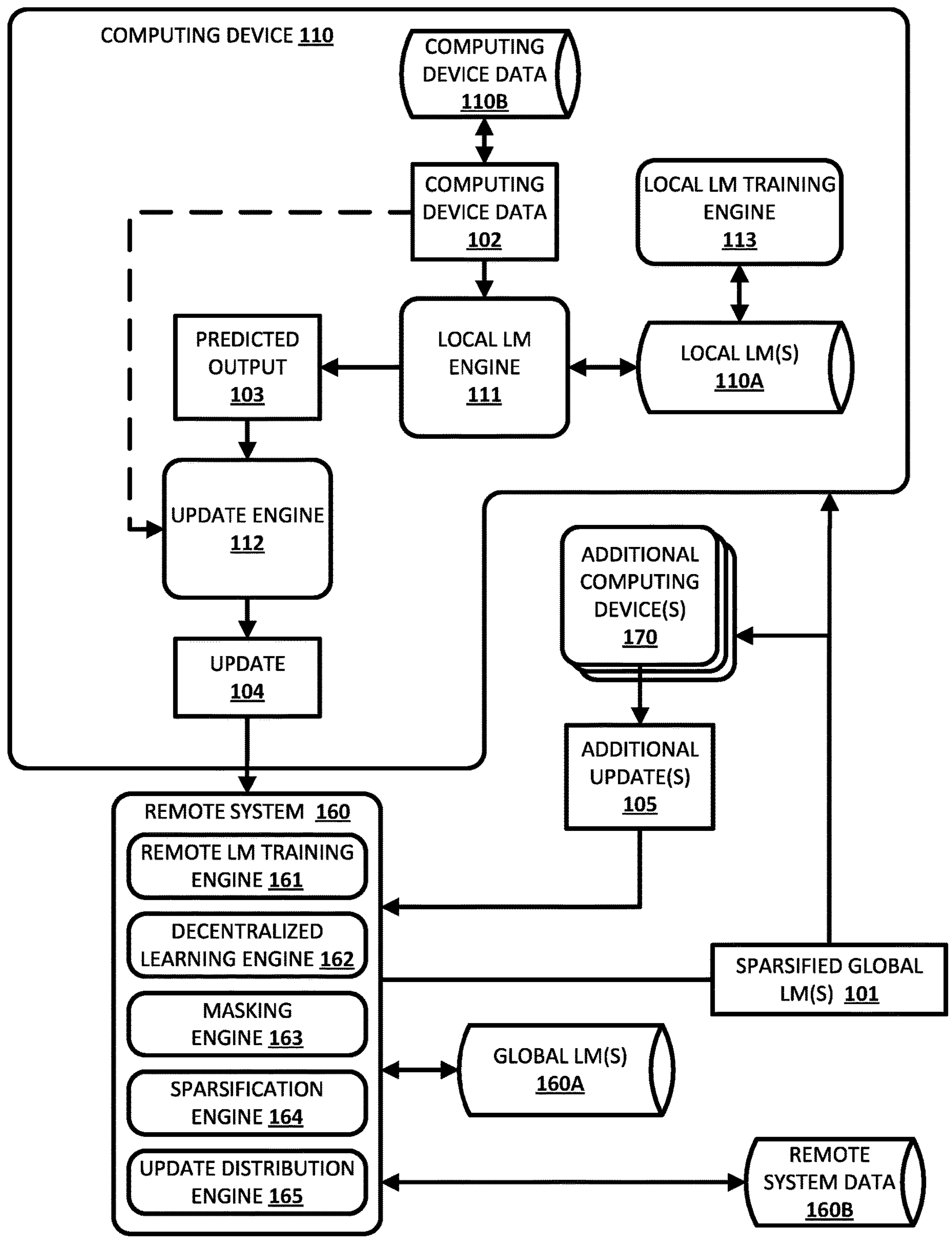
FIG. 1 depicts an example process flow that demonstrates various aspects of the present disclosure, in accordance with various implementations.

Turning now to FIG. 1, an example process flow that demonstrates various aspects of the present disclosure is depicted. A computing device 110 is illustrated in FIG. 1, and includes the components that are encompassed within the box of FIG. 1 that represents the computing device 110, such as local language model (LM) engine 111, update engine 112, and local LM training engine 113. The computing device 110 may be, for example, a standalone device (e.g., having microphone(s), vision component(s), speaker(s), display(s), and/or other user interface components), a smartphone, a laptop, a desktop computer, a tablet, a wearable computing device, a vehicular computing device, a high performance server or cluster of high performance servers, and/or any other computing device capable of implementing the components that are encompassed within the box of FIG. 1 that represents the computing device 110.

Further, a remote system 160 is illustrated in FIG. 1, and includes the components that are encompassed within the box of FIG. 1 that represents the remote system 160. The remote system 160 may be, for example, a high performance server or cluster of high performance servers, and/or any other remote system capable of implementing the components that are encompassed within the box of FIG. 1 that represents the computing device 160, such as remote LM training engine 161, decentralized learning engine 162, masking engine 163, sparsification engine 164, and update distribution engine 165. The computing device 110 and the remote system 160 may be communicatively coupled over one or more networks (e.g., any combination of Wi-Fi, Bluetooth, or other local area networks (LANs); ethernet, the Internet, or other wide area networks (WANs); and/or other networks) that facilitate the transfer of data therebetween.

As described herein, the process flow of FIG. 1 can be utilized to initially a global LM at the remote system 160 and/or obtain a global LM that is accessible to the remote system 160 and that was previously trained. Further, the process flow of FIG. 1 can be utilized to update the global LM in a decentralized manner. The global LM can include any LM, such as recurrent neural network-based (RNN-based) LMs, transformer-based large LMs (LLMs), conformer-based LMs, and/or other LMs to be updated in a decentralized manner. Notably, the RNN-based LMs can include LSTM-based LMs, GRU-based LMs, or other LMs that process a sequence of words or phrases to predict a next word or phrase and/or to generate a summary of the sequence of words or phrases. These RNN-based LMs are sequential in nature and usually include hundreds of thousands of parameters or millions of parameters. Further, the transformer-based LMs can include LLMs, such as LaMDA, Meena, GPT-1, GPT-3, and/or other LLMs that process a sequence of words or phrases to predict a next word or phrase and/or to generate a summary of the sequence of words or phrases. While these transformer-based LLMs are also sequential in nature, they also employ one or more attention mechanisms to learn which words or phrases in the sequence of words or phrases deserve more attention than others, and usually include hundreds of millions of parameters or billions of parameters.

In some instances, one of the biggest contributors to the size of these LMs (e.g., in terms of parameters) can be an embedding matrix that corresponds to an encoding of words or phrases mapped to a lower-dimensional space (e.g., two-dimensional space). Further, the embedding matrix can also encode semantic relationships between different words or phrases, and as the global LM is trained to have a larger vocabulary, the size of the embedding matrix increases. Moreover, as the size of the embedding matrix increases, the global LM becomes less conducive to being updated in a decentralized manner since the global LM (or weights of the global LM) have to be transmitted to the computing device 110 to enable the computing device 110 to generate an update for the global LM, and the update has to be transmitted back to the remote system 160. As noted herein, the given round of decentralized learning is often a time-limited process, and if too much time is spent transmitting the global LM to the computing device 110 and/or receiving the update for the global LM, then there is not sufficient time for the computing device 110 to actually generate the update or the global LM. Accordingly, techniques described herein are directed to reducing the size of the global LM in terms of trainability of the global LM and/or in terms of transferability of the global LM, and based on the sparsification of the global LM. By reducing the size of the global LM in terms of trainability of the global LM and/or in terms of transferability of the global LM, decentralized learning thereof is enabled.

In some implementations, the remote LM training engine 161 can initially train the global LM (e.g., stored in global LM(s) database 160A) based on remote system data (e.g., stored in remote system data database 160B). The remote system data may include any data that is publicly available, such as publicly available data sets, publicly available webpages, publicly available documents, and/or any other publicly available data that may be utilized in training the global LM. Further, the remote LM training engine 161 can initially train the global LM using supervised and/or self-supervised learning techniques. In these implementations, the remote LM training engine 161 can provide the global LM that was initially trained at the remote system 160 to the decentralized learning engine 162 to enable subsequent decentralized learning of the global LM. In other implementations, the remote LM training engine 161 can obtain the global LM from remote storage of the remote system 160 (e.g., from the global LM(s) database 160A) and refrain from initially training the global LM. In these implementations, the remote LM training engine 161 can provide the global LM that was obtained to the decentralized learning engine 162 to enable subsequent decentralized learning of the global LM.

One example of training the global LM using a self-supervised learning technique can include obtaining a plurality of training instances. For instance, in using a given training instance of the plurality of training instances, the remote LM training engine 161 can process, using the global LM, a sequence of text that corresponds to training instance input to generate predicted output. The predicted output can include, for example, a probability distribution over a sequence of words that is associated with a next word or phrase in the sequence of text. Further, the predicted output can be compared to ground truth output (e.g., the actual next word or phrase in the sequence) that corresponds to training instance output to generate one or more losses (e.g., using stochastic gradient descent). The global LM can be updated based on the one or more losses (e.g., via backpropagation). Although a particular supervised learning technique is described herein, it should be understood that is for the sake of example and is not meant to be limiting.

Further, one example of training the global LM using a self-supervised learning technique can include a word or phrase masking technique. For instance, in using the word or phrase masking technique, the remote LM training engine 161 can mask a target word or phrase from, for example, a document, and cause the global LM model to process additional words or phrases from the document to generate predicted output. The predicted output can include, for example, a probability distribution over a sequence of words that is associated with a predicted target word or phrase that is predicted to correspond to the actual target word or phrase. Further, the predicted target word or phrase (or the probability distribution) can be compared to the actual word or phrase that was masked to generate one or more losses. The global LM can be updated based on the one or more losses (e.g., via backpropagation). Another example of training the global LM using a self-supervised learning technique can include a student-teacher technique. For instance, in using the student-teacher technique, the remote LM training engine 161 can cause the global LM model to process words or phrases from a document to generate predicted output. The predicted output can include, for example, a probability distribution over a sequence of words that is associated with a summary of the document. Further, the remote LM training engine 161 can cause another global LM model that is already trained to process words or phrases from the same document to generate benchmark output. The benchmark output can include, for example, a benchmark probability distribution over a sequence of words that is associated with a benchmark summary of the document. Moreover, the summary (or the probability distribution over the sequence of words that is associated with the summary) can be compared to the benchmark summary (or the benchmark probability distribution over the sequence of words that is associated with the benchmark summary) to generate one or more losses. The global LM can be updated based on the one or more losses (e.g., via backpropagation). Although particular semi-supervised learning techniques are described herein, it should be understood that is for the sake of example and is not meant to be limiting.

The decentralized learning engine 162 can identify a population of computing devices to participate in a given round of decentralized learning for updating of the global LM. For instance, each of the computing devices of the population can check-in to the population of computing devices by transmitting an indication to the remote system 160 that the respective computing devices are available to participate in the given round of decentralized learning. In this instance, the decentralized learning engine 162 can identify those computing devices for inclusion in the population. For the sake of example, assume that the computing device 110 and one or more additional computing devices 170 have checked-in to the population to participate in the given round of decentralized learning. However, and as noted above, the global LM may be too large to effectively update the global LM through decentralized learning. Accordingly, the transferable size of the global LM may need to be reduced prior to causing the global LM to be transmitted to the population of client devices.

The masking engine 163 can generate a global embedding mask for the global embedding matrix of the global LM. Subsequent to generating the global embedding mask for the global embedding matrix of the global LM, the sparsification engine 164 can apply the global embedding mask to the global embedding matrix of the global LM to generate a sparsified global LM that is a sparsified version of the global LM and that is of a reduced size compared to the global LM in terms of trainability of the global LM and/or in terms of transferability of the global LM. In generating the global embedding mask for the global embedding matrix of the global LM, the masking engine 163 can utilize various masking techniques, such as a left aligned masking technique, a randomly aligned masking technique, a lottery ticket hypothesis (LTH) masking technique, and/or other masking techniques that can be employed to effectively reduce a size of the global embedding matrix to enable the global LM to be updated using decentralized learning. Notably, in generating the global embedding mask using the masking technique, the masking engine 163 can generate the global embedding mask based on a distribution of n-grams for the global embedding matrix (e.g., a distribution of unigrams, a distribution of bigrams, and/or a distribution of other n-grams) and based on a minimum embedding size threshold with respect to the distribution of n-grams for the global embedding matrix and/or a maximum embedding size threshold with respect to the distribution of n-grams for the global embedding matrix. Notably, the minimum embedding size threshold and/or the maximum embedding size threshold can be, for example, hard coded parameters or tunable parameters.

The minimum embedding size threshold with respect to the distribution of n-grams for the global embedding matrix can correspond to, for example, a fixed minimum embedding size for a word with the lowest unigram probability in the distribution of n-grams for the global embedding matrix (e.g., size of 1, 16, 24, 48, 72, or other embedding sizes that are smaller than the maximum embedding size threshold). Further, the maximum embedding size threshold with respect to the distribution of n-grams for the global embedding matrix can correspond to, for example, an input embedding size for the global LM (e.g., size of 96, 128, or other embedding sizes that are greater than the minimum embedding size threshold). The relationship between the unigram probability in the distribution of n-grams for the global embedding matrix and the post-pruning embedding size can be represented by (Equation 1):

$$\frac{E(w_i) - \min E(w)}{\max E(w) - \min E(w)} = \text{round}\left(\frac{\min(P(w_i), MUT) - \min P(w)}{\min(\max P(w), MUT) - \min P(w)}\right) \quad \text{(Equation 1)}$$

where $E(w_i)$ represents the embedding size for a word $w_i$ in the global embedding matrix, where $P(w_i)$ represents the unigram probability for the word $w_i$ in the global embedding matrix, and where MUT represent the maximum unigram probability threshold.

For example, and referring briefly to FIGS. 2A and 2B, tables 200A and 200B that include various masking techniques that may be utilized to generate the global embedding mask for the global embedding matrix of the global LM are depicted. The tables 200A and 200B of FIGS. 2A and 2B depict example masked word embeddings for particular words in the global embedding matrix. Notably, each embedding mask (e.g., for each unigram or for each n-gram of the distribution) in the global embedding matrix has the same shape. However, in applying the embedding mask, the transferable size of each embedding mask is effectively reduced by pruning values for each unigram or for each n-gram in the distribution. The various masking techniques described herein are two-dimensional Boolean masks and relate to different techniques for aligning the masks for each unigram or for each n-gram of the distribution.

For instance, FIG. 2A depicts the table 200A that includes example masked word embeddings for a particular word in the global embedding matrix that occurs frequently and/or across multiple contexts (e.g., for a particular word such as "I", "you", "the", "to", etc.). Notably, the word embeddings for these types of words can be reduced since they are encountered frequently and across the multiple contexts. In contrast, FIG. 2B depicts the table 200B that includes example masked word embeddings for a particular word in the global embedding matrix that occurs rarely and/or in limited contexts (e.g., for a particular word that may be considered a tail word). Notably, the word embeddings for these types of words can be reduced since fewer parameters are needed to represent these limited contexts. Nonetheless, the embeddings for the words that occur frequently and/or across multiple contexts may need to include more unmasked values (or non-pruned values) to better represent the more frequent words across the multiple contexts as reflected by the table 200A for a given frequent word including four unmasked values (or non-pruned values) as compared to the table 200B for a given tail word including only three unmasked values (or non-pruned values). Although the tables 200A and 200B depict a particular quantity of unmasked values (or non-pruned values), it should be understood that particular quantity is for the sake of example and is not meant to be limiting.

As noted above, the various masking techniques described herein are two-dimensional Boolean masks and relate to different techniques for aligning the masks for each unigram or for each n-gram of the distribution. In some implementations, the masking engine 163 and/or the sparsification engine 164 can employ a left aligned masking technique. According to the left aligned masking technique (e.g., reflected in row 201A of the table 200A for the given frequent word and in row 201B of the table 200B for the given tail word), an initial sequential portion of the corresponding word embedding vector can be set to "true" (e.g., [0.85, . . . , 0.52] in row 201A and [0.61, . . . , −0.93] in row 201B) and be represented by the underlying values in the corresponding word embedding vector, whereas a remaining sequential portion of the corresponding word embedding vector can be set to "false" (e.g., [ . . . , 0.00, . . . , 0.00] in row 201A and [ . . . , 0.00, . . . , 0.00] in row 201B) and be represented by zero. Notably, the remaining sequential portion and the initial sequential portion in the left aligned masking technique are mutually exclusive. In applying the embedding mask according to the left aligned masking technique, a length of the initial sequential portion may be constrained by the minimum embedding size threshold with respect to the distribution of n-grams for the global embedding matrix and/or the maximum embedding size threshold with respect to the distribution of n-grams for the global embedding matrix.

In additional or alternative implementations, the masking engine 163 and/or the sparsification engine 164 can employ a randomly aligned masking technique. According to the randomly aligned masking technique (e.g., reflected in row 202A of the table 200A for the given frequent word and in row 202B of the table 200B for the given tail word), a first non-sequential portion of the corresponding word embedding vector can be set to "true" (e.g., [0.85, . . . , 0.52, . . . , −0.43, . . . 0.79] in row 202A and [ . . . , 0.42, . . . , 0.55, . . . , −0.71] in row 202B) and be represented by the underlying values in the corresponding word embedding vector, whereas a second non-sequential portion of the corresponding word embedding vector can be set to "false" (e.g., [ . . . , 0.00, . . . , 0.00] in row 202A and [0.00, . . . , 0.00] in row 202B) and be represented by zero. Notably, the second non-sequential portion and the first non-sequential portion in the randomly aligned masking technique are also mutually exclusive. In applying the embedding mask according to the randomly aligned masking technique, a quantity of values included in the first non-sequential portion may be constrained by the minimum embedding size threshold with respect to the distribution of n-grams for the global embedding matrix and/or the maximum embedding size threshold with respect to the distribution of n-grams for the global embedding matrix.

In additional or alternative implementations, the masking engine 163 and/or the sparsification engine 164 can employ a LTH masking technique. According to the LTH masking technique (e.g., reflected in row 203A of the table 200A for the given frequent word and in row 203B of the table 200B for the given tail word), a LTH mask in initially learned through a technique such as iterative magnitude pruning. The goal of the iterative magnitude pruning is to iteratively prune parameters of the global embedding matrix of the global LM through multiple iterations of training to identify a sparsified version of the global LM that includes fewer parameters than the original global LM, but matches the precision and/or recall of the original global LM when the sparsified version of the global LM is trained the same number of iterations as the original global LM. Further, a first portion of the corresponding word embedding vector can be set to "true" (e.g., [0.85, . . . , 0.13, . . . 0.52, . . . , −0.43, . . . ] in row 203A and [0.61, . . . , −0.93, . . . , −0.71] in row 203B) and be represented by the underlying values in the corresponding word embedding vector, whereas a second portion of the corresponding word embedding vector can be set to "false" (e.g., [ . . . , 0.00, . . . , 0.00] in row 203A and [ . . . , 0.00, . . . , 0.00, . . . ] in row 203B) and be represented by zero. Notably, the second portion and the first portion in the LTH masking technique are also mutually exclusive. In applying the embedding mask according to the LTH masking technique, a quantity of values included in the first portion may be constrained by the minimum embedding size threshold with respect to the distribution of n-grams for the global embedding matrix and/or the maximum embedding size threshold with respect to the distribution of n-grams for the global embedding matrix.

Although particular masking techniques are described herein, it should be understood that those techniques are provided for the sake of example and are not meant to be limiting. Further, it should be understood that a developer that is associated with the global LM may specify which masking technique should be utilized in different situations. However, it should be noted that the left aligned masking technique has demonstrated to be the most efficient technique in terms of compression from among the three different masking techniques described above and has yielded the same accuracy for the same sparsity as the other masking techniques described above.

Referring back to FIG. 1, and subsequent to applying the global embedding mask to the global embedding matrix of the global LM to generate the sparsified global LM, the sparsification engine 164 can cause the sparsified global LM to be stored in remote storage of the remote system 160 (e.g., the global LM(s) database 160A) as a checkpoint. Accordingly, when the decentralize learning engine 162 identifies the population of computing devices to participate in a given round of decentralized learning (e.g., including the computing device 110 and one or more of the additional computing device(s) 170) for updating of the global LM, the decentralized learning engine 162 can cause the sparsified global LM to be transmitted to the computing device 110 as indicated by 101.

In response to receiving the sparsified global LM, the computing device 110 can store the sparsified global LM in computing device storage (e.g., local LM(s) database 110A) of the computing device 110 as an on-device LM. Further, the computing device 110 can cause the computing device to generate an update for the global LM via utilization of the sparsified global LM. For example, the local LM engine 111 can obtain computing device data 102 from computing device storage (e.g., computing device data database 110B) of the computing device 110. The computing device data may include any data that is available at the computing device 110 and may or may not include access-restricted data, such as any data set that is available at the computing device 110, any document that is available at the computing device 110, and/or any other data that may be utilized in generating the update for the global LM. Further, the local LM engine 111 can process, using the on-device LM that corresponds to the sparsified global LM, the computing device data 102 to generate predicted output 103. Moreover, the update engine 112 can generate an update 104 for the global LM based processing predicted output 103 (and optionally based on the computing device data 102 that was originally processed as indicated by the dashed line). Notably, in generating the update 104 for the global LM, the update engine 112 can use one or more supervised and/or semi-supervised learning techniques described herein (e.g., described with respect to the remote LM training engine 161 of the remote system 160), but locally at the computing device 110. The computing device 110 can transmit the update back to the remote system 160.

In some implementations, the local LM training engine 113 can update the on-device LM that corresponds to the sparsified global LM locally at the computing device 110. For example, in these implementation, the update 104 can correspond to one or more losses for the on-device LM, and the one or more losses can be utilized to update weights (e.g., via backpropagation) of the on-device LM that corresponds to the sparsified global LM. Further, in these implementations, the update 104 can correspond to updated weights of the on-device LM that corresponds to the sparsified global LM.

In response to receiving the update 104 from the computing device 110, and one or more additional updates 105 from one or more of the additional computing devices 170 (e.g., generated locally at a respective one of the additional computing device(s) 170 in the same or similar manner described with respect to the computing device) that were also identified for inclusion of the population of computing devices to participate in the given round of decentralized learning, the remote LM training engine 161 can cause the global LM to be updated, based on the update 104 and/or the additional update(s) 105, to generate an updated global LM. For example, in implementations where the update 104 and/or the additional update(s) 105 correspond to one or more losses, the remote LM training engine 161 can update global weights of the global LM based on the one or more losses (e.g., via backpropagation). Also, for example, in implementations where the update 104 and/or the additional update(s) 105 correspond to updated weights for the respective on-device LM that corresponds to the sparsified global LM, the remote LM training engine 161 can average the weights received from the computing device 110 and one or more of the additional computing devices 170, and replace the global weights of the global LM with the averaged weights received from the computing device 110 and one or more of the additional computing devices 170.

Notably, the remote system 160 can initiate a subsequent round of decentralized learning for updating of the global LM. In the subsequent round of decentralized learning, the remote system 160 can utilize the checkpoint of the global LM stored in the global LM(s) database 160A, or the remote system 160 can generate another checkpoint, but with respect to the updated global LM that was updated based on one or more prior rounds of decentralized learning. In this manner, the remote system 160 can continue updating the global LM until one or more conditions are satisfied. The one or more conditions can include, for example, a threshold duration and/or quantity of updating of the global LM, a measured improvement to the updated global LM, and/or other conditions. In some implementations, and in response to the one or more conditions being satisfied, the update distribution engine 165 can cause the update global LM (or a sparsified version thereof) to be distributed to a plurality of computing devices for use locally at each of the plurality of computing devices.

Figure 3:
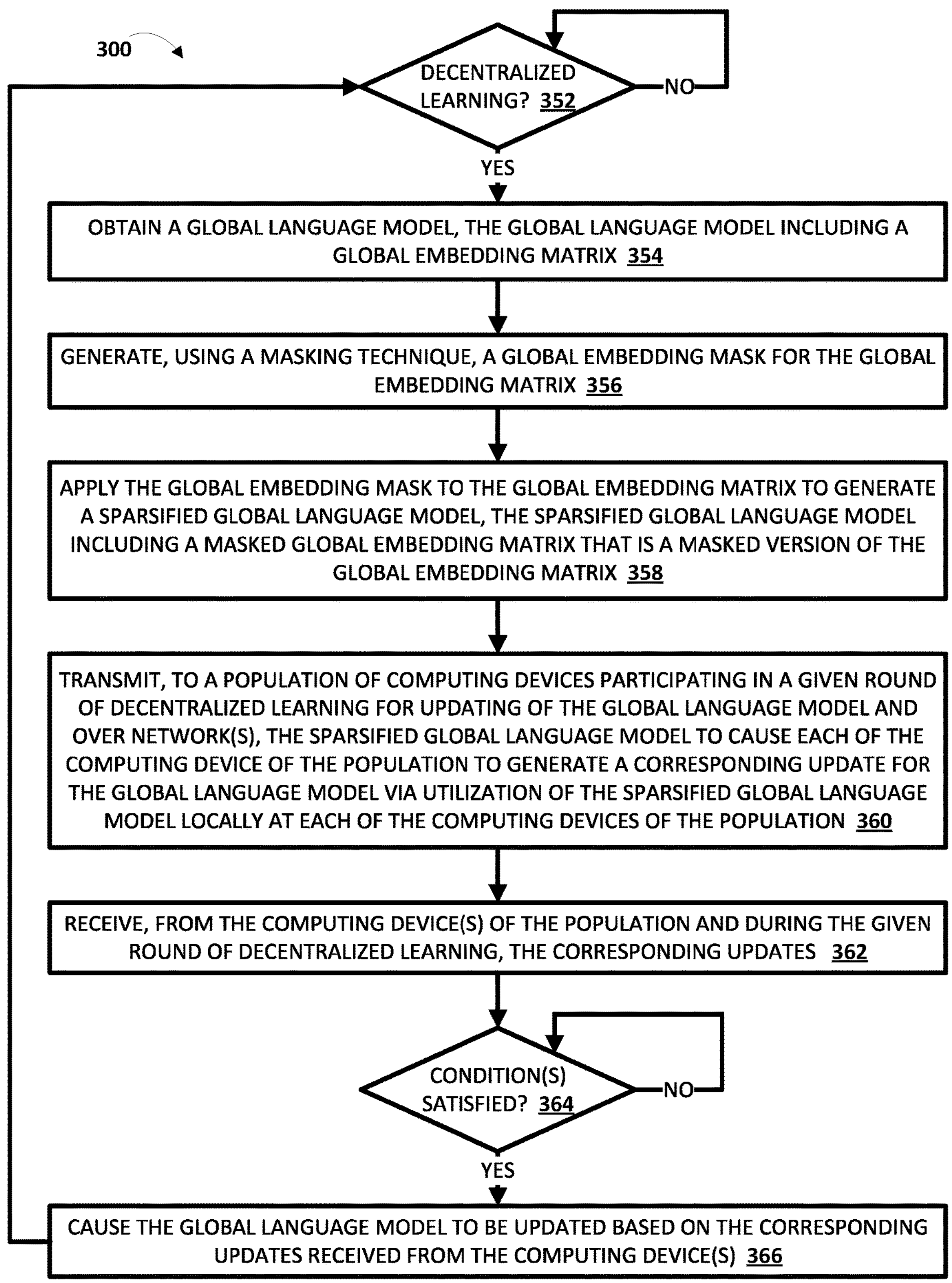
FIG. 3 depicts a flowchart illustrating an example method of server-side aspects for reducing a transferable size of a global language model (LM) to enable decentralized learning thereof, in accordance with various implementations.

Turning now to FIG. 3, a flowchart illustrating an example method 300 of server-side aspects for reducing a transferable size of a global language model to enable decentralized learning thereof is depicted. For convenience, the operations of the method 300 are described with reference to a system that performs the operations. The system of method 300 includes one or more processors and/or other component(s) of a computing device (e.g., the remote system 160 of FIG. 1, computing device 510 of FIG. 5, a high performance server or cluster of high performance servers, and/or other computing devices). Moreover, while operations of the method 300 are shown in a particular order, this is not meant to be limiting. One or more operations may be reordered, omitted, or added.

At block 352, the system determines whether to initiate a given round of decentralized learning for updating of a global language model. For example, the system can determine to initiate a given round of decentralized learning for updating of the global language model in response to a plurality of computing devices checking-in for the given round of decentralized learning. For instance, each of the computing devices can transmit a corresponding indication to the system that the respective computing devices are available to participate in the given round of decentralized learning. In this instance, the system can identify the computing devices that transmitted the corresponding indication for inclusion in a population of computing devices for the given round of decentralized learning.

If, at an iteration of block 352, the system determines not to initiate the given round of decentralized learning for updating of the global language model, then the system continues monitoring for whether to initiate the given round of decentralized learning for updating of the global language model at block 352. If, at an iteration of block 352, the system determines to initiate the given round of decentralized learning for updating of the global language model, then the system proceeds to block 354.

At block 354, the system obtains a global language model, the global language model including a global embedding matrix. In some implementations, the system may initially train the global language model in a supervised manner and/or semi-supervised manner and based remote system data that is available to the system. Put another way, in these implementations, the system can initially bootstrap the language model based on publicly accessible data that is available to the system. In other implementations, the global language model may have already been trained, and, in these implementations, the system can simply obtain the global language model from one or more databases.

At block 356, the system generates, using a masking technique, a global embedding mask for the global embedding matrix. At block 358, the system applies the global embedding mask to the global embedding matrix to generate a sparsified global language model, the sparsified global language model including a masked global embedding matrix that is a masked version of the global embedding matrix. The system can generate and apply the global embedding mask using, for example, a left aligned masking technique, a randomly aligned masking technique, and/or an LTH masking technique (e.g., as described with respect to FIGS. 2A and 2B), and in any manner described with respect to FIG. 1 (e.g., with respect to the masking engine 163).

At block 360, the system transmits, to a population of computing devices participating in a given round of decentralized learning for updating of the global language model and over one or more networks, the sparsified global language model to cause each of the computing devices of the population to generate a corresponding update for the global language model via utilization of the sparsified global language model locally at each of the computing devices of the population. The system can transmit the sparsified global language model as a proxy for the global language model. Notably, the sparsified global language model is of a reduced size (e.g., in terms of trainability of the global LM and/or in terms of transferability of the global LM) as compared to the global language model as a result of the global embedding mask being applied to the global embedding matrix. As a result, the sparsified global language model is more conducive to being transmitted to the population of computing devices during the given round of decentralized learning.

At block 362, the system receives, from one or more of the computing devices of the population and during the given round of decentralized learning, the corresponding updates. The corresponding updates can include, for example, loss(es) generated locally at one or more of the computing devices, updated weights for the global language model that are generated based on processing corresponding computing device data locally at one or more of the computing devices, and/or other data that corresponds to an update for the global language model. Generating the corresponding updates is described in more detail herein (e.g., with respect to the computing device 110 of FIG. 1 and with respect to FIG. 4).

At block 364, the system determines whether one or more conditions are satisfied for updating the global language model. The one or more conditions can include, for example, whether a threshold duration of time has lapsed since the computing devices checked-in to the population of computing devices, whether a threshold quantity of updates have been received from one or more of the computing devices, and/or any other conditions that, when satisfied, result in the global language model being updated. If, at an iteration of block 364, the system determines that the one or more conditions are not satisfied, then the system continues monitoring for satisfaction of the one or more conditions at block 364. If, at an iteration of block 364, the system determines that the one or more conditions are satisfied, then the system proceeds to block 366.

At block 366, the system causes the global language model to be updated based on the corresponding updates received from one or more of the computing devices of the population. For example, in implementations where the corresponding updates include one or more losses, the global language model can be updated based on the one or more losses (e.g., via backpropagation). Also, for example, in implementations where the corresponding updates include updated weights for the global language model, the system can average the weights that are received as the corresponding updates, and can replace weights of the global language model with the averaged weights.

The system returns to block 352 to determine whether to initiate a given additional round of decentralized learning for further updating of the global language model or for updating of an additional global language model that is in addition to the global language model. For example, the system can initiate the given additional round of decentralized learning for further updating of the global language model or for updating of the additional global language model that is in addition to the global language model with respect to an additional population of computing devices. In implementations where the system determines whether to initiate the given additional round of decentralized learning, the system can consider how many rounds of decentralized learning have been performed with respect to the global language model.

Figure 4:
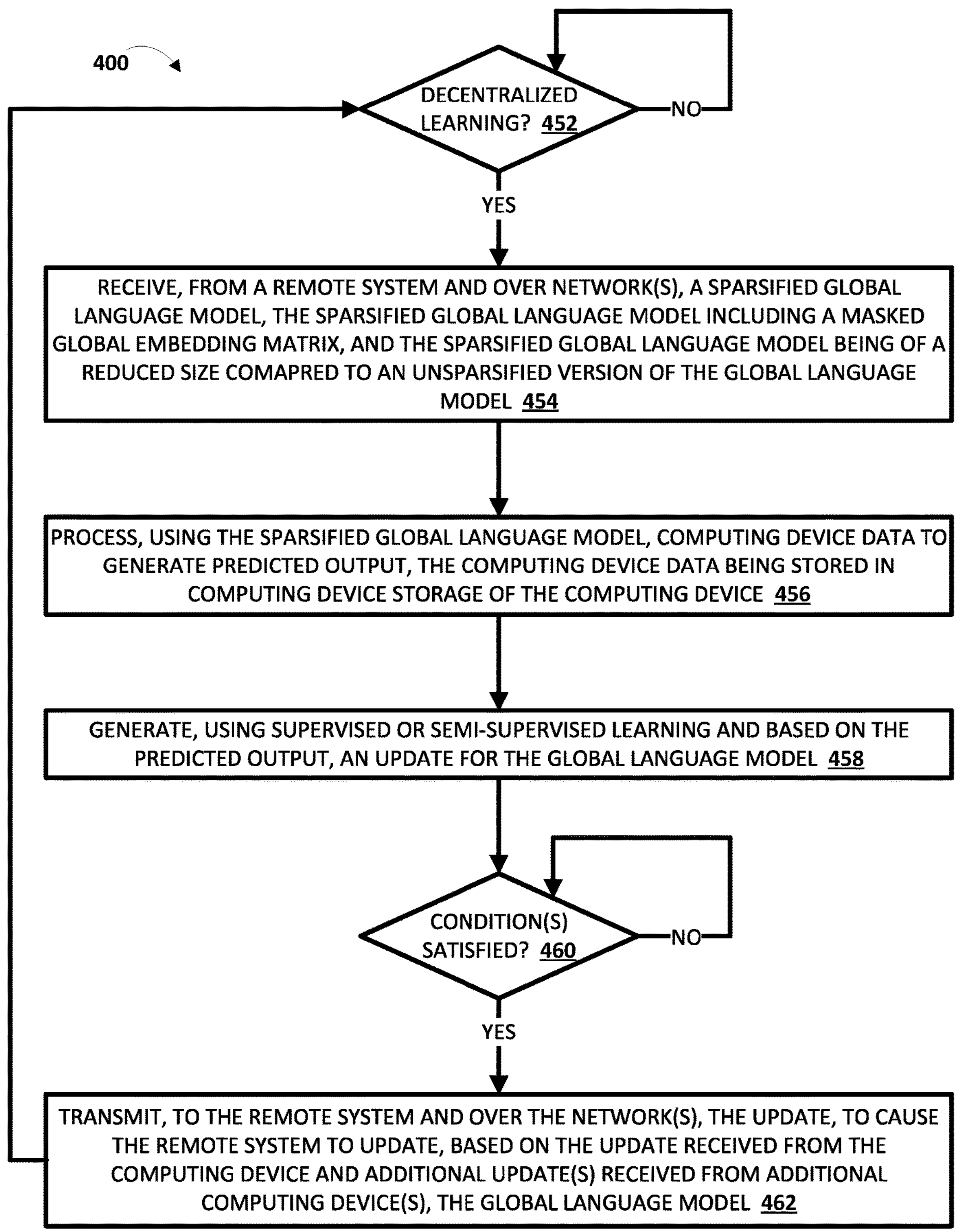
FIG. 4 depicts a flowchart illustrating an example method of device-side aspects for decentralized learning of a global language model (LM), in accordance with various implementations.

Turning now to FIG. 4, a flowchart illustrating an example method 400 of device-side aspects for decentralized learning of a global language model is depicted. For convenience, the operations of the method 400 are described with reference to a system that performs the operations. The system of method 400 includes one or more processors and/or other component(s) of a computing device (e.g., the computing system 110 of FIG. 1, computing device 510 of FIG. 5, a client device of a user, a high performance server or cluster of high performance servers, and/or other computing devices). Moreover, while operations of the method 400 are shown in a particular order, this is not meant to be limiting. One or more operations may be reordered, omitted, or added.

At block 452, the system determines whether to participate in a given round of decentralized learning for updating of a global language model. The system can determine whether to participate in the given round of decentralized learning based on, for example, a time of day associated with the computing device, a day of week associated with the computing device, whether the computing device is charging, whether the computing device has a threshold state of charge, whether the computing device is being actively utilized by a user, whether a threshold duration of time has elapsed since the computing device last participated in a round of decentralized learning, whether the computing device is connected to one or more networks, whether the computing device is capable of utilizing a language model or a sparsified version of the language model, and/or based on other factors. If, at an iteration of block 452, the system determines not to initiate the given round of decentralized learning for updating of the global language model, then the system continues monitoring for whether to initiate the given round of decentralized learning for updating of the global language model at block 452. If, at an iteration of block 452, the system determines to initiate the given round of decentralized learning for updating of the global language model, then the system proceeds to block 454.

At block 454, the system receives, from a remote system and over one or more networks, a sparsified global language model, the sparsified global language model including a masked global embedding matrix, and the sparsified global language model being of a reduced transferable size compared to an unsparsified version of the global language model. In some implementations, the system may receive the sparsified global language model in response to transmitting an indication to the remote system that indicates the client device has checked-in to a population of computing devices to participate in the given round of decentralized learning. Further, the system can cause the computing device to store, in computing device storage of the computing device, the sparsified global language model for subsequent utilization by the computing device.

At block 456, the system processes, using the sparsified global language model, computing device data to generate predicted output, the computing device data being stored in computing device storage of the computing device. At block 458, the system generates, using supervised or semi-supervised learning and based on the predicted output, an update for the global language model. The predicted output can be, for example, a probability distribution over a sequence of words or phrases that predicts a next word in a sequence, a masked word in a sequence, a summary of a document or webpage, and/or any other predicted output described herein (e.g., with respect to the remote LM training engine 161 of FIG. 1). Notably, the predicted output may vary based on the learning technique being utilized and/or based on the computing device data that is being processed by the system.

At block 460, the system determines whether one or more conditions are satisfied for transmitting the update to the remote system. The one or more conditions can include, for example, a time of day associated with the computing device, a day of week associated with the computing device, whether the computing device is charging, whether the computing device has a threshold state of charge, whether the computing device is being actively utilized by a user, whether a threshold duration of time has elapsed since the computing device began participating in the given round of decentralized learning, whether the computing device is connected to one or more networks, and/or based on other conditions. If, at an iteration of block 460, the system determines that the one or more conditions are not satisfied, then the system continues monitoring for satisfaction of the one or more conditions at block 460. If, at an iteration of block 460, the system determines that the one or more conditions are satisfied, then the system proceeds to block 462.

At block 462, the system transmits, to the remote system and over one or more of the networks, the update to cause the remote system to update, based on the update received from the computing device and one or more additional updates received from one or more additional computing devices, the global language model. Accordingly, the global language model can be updated on data that may not be otherwise accessible (e.g., access-restricted computing device data) while also preserving security of data of any users that may be associated with the computing devices.

The system returns to block 452 to determine whether to participate in a given additional round of decentralized learning for further updating of the global language model or for updating of an additional global language model that is in addition to the global language model. For example, the system may wait a certain duration of time before checking-in the computing device for another round of decentralized learning. This enables the system to balance background tasks that are performed by the computing device and prolong performance of the computing device.

Figure 5:
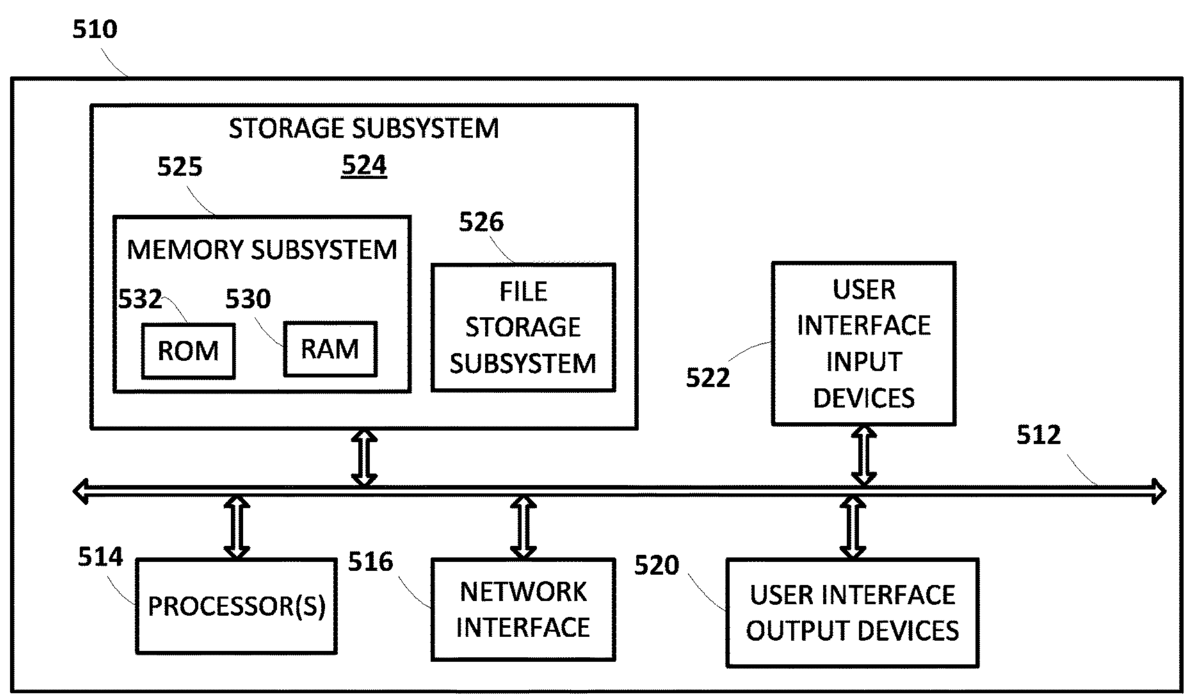
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device, cloud-based automated assistant component(s), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIGS. 1A, 1B, and 2.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method performed by one or more processors of a remote system is provided and includes obtaining, from remote storage of the remote system, a global language model, the global language model including a global embedding matrix; generating, using a masking technique, a global embedding mask for the global embedding matrix; applying the global embedding mask to the global embedding matrix to generate a sparsified global language model, the sparsified global language model including a masked global embedding matrix that is a masked version of the global embedding matrix; transmitting, to a population of computing device participating in a given round of decentralized learning for updating of the global language model and over one or more networks, the sparsified global language model to cause each of the computing devices to generate a corresponding update for the global language model via utilization of the sparsified global language model locally at each of the computing devices of population; receiving, from one or more of the computing devices of the population during the given round of decentralized learning and over one or more of the networks, the corresponding updates; and causing the global language model to be updated based on the corresponding updates that are received from the one or more of the computing devices of the population.

These and other implementations of the technology can include one or more of the following features.

In some implementations, generating the global embedding mask using the masking technique can be based on a distribution of n-grams for the global embedding matrix.

In some versions of those implementations, generating the global embedding mask using the masking technique and based on the distribution of n-grams for the global embedding matrix can be based on a minimum embedding size of one or more of the n-grams of the distribution of n-grams and/or based on a maximum embedding size of one or more other of the n-grams of the distribution of n-grams.

In some further versions of those implementations, the minimum embedding size of the one or more of the n-grams of the distribution of n-grams and the maximum embedding size of one or more other of the n-grams of the distribution of n-grams can both be tunable parameters.

In some implementations, the masking technique can include one of: a left aligned masking technique, a randomly aligned masking technique, or a lottery ticket hypothesis (LTH) masking technique.

In some versions of those implementations, the masking technique can include the left aligned masking technique, and using the left aligned masking technique as the masking technique to generate the global embedding mask for the global embedding matrix can include, for each corresponding word embedding vector included in the global embedding matrix: setting an initial sequential portion of the corresponding word embedding vector to true; and setting a remaining sequential portion of the corresponding word embedding vector to false. The remaining sequential portion of the corresponding word embedding vector and the initial sequential portion of the corresponding word embedding vector can be mutually exclusive.

In additional or alternative versions of those implementations, the masking technique can include the randomly aligned masking technique, and using the randomly aligned masking technique as the masking technique to generate the global embedding mask for the global embedding matrix can include, for each corresponding word embedding vector included in the global embedding matrix: setting a first non-sequential portion of the corresponding word embedding vector to true; and setting a second non-sequential portion of the corresponding word embedding vector to false. The second non-sequential portion of the corresponding word embedding vector and the first second non-sequential portion of the corresponding word embedding vector can be mutually exclusive.

In additional or alternative versions of those implementations, the masking technique can include the LTH masking technique, and using the LTH masking technique as the masking technique to generate the global embedding mask for the global embedding matrix can include learning an LTH mask through iterative magnitude pruning of the global language model at the remote system; and for each corresponding word embedding vector included in the global embedding matrix: setting, based on the learned LTH mask, a first portion of the corresponding word embedding vector to true; and setting, based on the learned LTH mask, a second portion of the corresponding word embedding vector to false. The second portion of the corresponding word embedding vector and the first second portion of the corresponding word embedding vector can be mutually exclusive.

In some implementations, applying the global embedding mask to the global embedding matrix to generate the sparsified global language model can cause a subset of global weights, of the global language model, to be pruned.

In some versions of those implementations, the corresponding update generated locally at each of the computing devices of the population can be for only an additional subset of global weights, of the global language model, that are not pruned in applying the global embedding mask to the global embedding matrix.

In some implementations, the sparsified global language model can be of a reduced transferable size compared to the global language model.

In some implementations, the method can further include, prior to obtaining the global language model from the remote storage of the remote system: training the global language model based on a plurality of training instances. The plurality of training instances can be generated based on remote system data that is accessible by the remote system.

In some implementations, the method can further include identifying the population of computing devices that will participate in the given round of decentralized learning for updating of the global language model. Identifying the population of computing devices that will participate in the given round of decentralized learning for updating of the global language model can include receiving, from each of the computing devices of the population, a corresponding indication that each of the computing devices has checked-in to the population for the given round of decentralized learning for updating of the global language model.

In some implementations, causing a given computing device, of the computing devices of the population, to generate the corresponding update for the global language model via utilization of the sparsified global language model locally at the given computing device can cause the given computing device to: obtain, from given computing device storage of the given computing device, given computing device data that is stored locally at the given computing device; process, using the sparsified global language model, the given computing device data to generate given predicted output; and generate, using a supervised or semi-supervised learning technique and based on the given predicted output, the corresponding update for the global language model.

In some implementations, the given round of decentralized learning can be limited to a certain duration of time.

In some implementations, the global language model can be a recurrent neural network-based (RNN-based) language model.

In some implementations, the global language model can be a transformer-based large language model (LLM).

In some implementations, the global language model can be a generative language model.

In some implementations, the global language model can be a conformer-based language model.

In some implementations, a method performed by one or more processors of a computing device is provided and includes receiving, from a remote system and over one or more networks, a sparsified global language model, the sparsified global language model including a masked global embedding matrix, and the sparsified global language model being of a reduced transferable size compared to an unsparsified version of the global language model; processing, using the sparsified global language model, computing device data to generate predicted output, the computing device data being stored in computing device storage of the computing device; generating, using supervised or semi-supervised learning and based on the predicted output, an update for the global language model; and transmitting, to the remote system and over one or more of the networks, the update. Transmitting the update to the remote system causes the remote system to: cause, based on the update for the sparsified global language model received from the computing device and additional updates received from additional computing devices, the global language model to be updated to generate an updated global language model.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include an automated assistant client device (e.g., a client device including at least an automated assistant interface for interfacing with cloud-based automated assistant component(s)) that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

What is claimed is:

1. A method implemented by one or more remote processors of a remote system, the method comprising:

obtaining, from remote storage of the remote system, a global language model, the global language model including a global embedding matrix;

generating, using a masking technique, a global embedding mask for the global embedding matrix, wherein generating the global embedding mask for the global embedding matrix is based on a minimum embedding size of one or more n-grams of a distribution of n-grams and/or based on a maximum embedding size of one or more other n-grams of the distribution of n-grams;

applying the global embedding mask to the global embedding matrix to generate a sparsified global language model, the sparsified global language model including a masked global embedding matrix that is a masked version of the global embedding matrix;

transmitting, to a population of computing device participating in a given round of decentralized learning for updating of the global language model and over one or more networks, the sparsified global language model to cause each of the computing devices to generate a corresponding update for the global language model via utilization of the sparsified global language model locally at each of the computing devices of population;

receiving, from one or more of the computing devices of the population during the given round of decentralized learning and over one or more of the networks, the corresponding updates; and causing the global language model to be updated based on the corresponding updates that are received from the one or more of the computing devices of the population.

2. The method of claim 1, wherein the minimum embedding size of the one or more n-grams of the distribution of n-grams and the maximum embedding size of the one or more other n-grams of the distribution of n-grams are both tunable parameters.

3. The method of claim 1, wherein the masking technique comprises one of: a left aligned masking technique, a randomly aligned masking technique, or a lottery ticket hypothesis (LTH) masking technique.

4. The method of claim 3, wherein the masking technique comprises the left aligned masking technique, and wherein using the left aligned masking technique as the masking technique to generate the global embedding mask for the global embedding matrix comprises:

for each corresponding word embedding vector included in the global embedding matrix:

setting an initial sequential portion of the corresponding word embedding vector to true; and setting a remaining sequential portion of the corresponding word embedding vector to false, wherein the remaining sequential portion of the corresponding word embedding vector and the initial sequential portion of the corresponding word embedding vector are mutually exclusive.

5. The method of claim 3, wherein the masking technique comprises the randomly aligned masking technique, and wherein using the randomly aligned masking technique as the masking technique to generate the global embedding mask for the global embedding matrix comprises:

for each corresponding word embedding vector included in the global embedding matrix:

setting a first non-sequential portion of the corresponding word embedding vector to true; and setting a second non-sequential portion of the corresponding word embedding vector to false, wherein the second non-sequential portion of the corresponding word embedding vector and the first non-sequential portion of the corresponding word embedding vector are mutually exclusive.

6. The method of claim 3, wherein the masking technique comprises the LTH masking technique, and wherein using the LTH masking technique as the masking technique to generate the global embedding mask for the global embedding matrix comprises: l earning an LTH mask through iterative magnitude pruning of the global language model at the remote system; and for each corresponding word embedding vector included in the global embedding matrix:

setting, based on the learned LTH mask, a first portion of the corresponding word embedding vector to true; and setting, based on the learned LTH mask, a second portion of the corresponding word embedding vector to false, wherein the second portion of the corresponding word embedding vector and the first second portion of the corresponding word embedding vector are mutually exclusive.

7. The method of claim 1, wherein applying the global embedding mask to the global embedding matrix to generate the sparsified global language model causes a subset of global weights, of the global language model, to be pruned.

8. The method of claim 7, wherein the corresponding update generated locally at each of the computing devices of the population is for only an additional subset of global weights, of the global language model, that are not pruned in applying the global embedding mask to the global embedding matrix.

9. The method of claim 1, wherein the sparsified global language model is of a reduced transferable size compared to the global language model.

10. The method of claim 1, further comprising:

prior to obtaining the global language model from the remote storage of the remote system:

training the global language model based on a plurality of training instances, wherein the plurality of training instances are generated based on remote system data that is accessible by the remote system.

11. The method of claim 1, further comprising:

identifying the population of computing devices that will participate in the given round of decentralized learning for updating of the global language model, wherein identifying the population of computing devices that will participate in the given round of decentralized learning for updating of the global language model comprises:

receiving, from each of the computing devices of the population, a corresponding indication that each of the computing devices has checked-in to the population for the given round of decentralized learning for updating of the global language model.

12. The method of claim 1, wherein causing a given computing device, of the computing devices of the population, to generate the corresponding update for the global language model via utilization of the sparsified global language model locally at the given computing device causes the given computing device to:

obtain, from given computing device storage of the given computing device, given computing device data that is stored locally at the given computing device;

process, using the sparsified global language model, the given computing device data to generate given predicted output; and generate, using a supervised or semi-supervised learning technique and based on the given predicted output, the corresponding update for the global language model.

13. The method of claim 1, wherein the given round of decentralized learning is limited to a certain duration of time.

14. The method of claim 1, wherein the global language model is a recurrent neural network-based (RNN-based) language model.

15. The method of claim 1, wherein the global language model is a transformer-based large language model (LLM).

16. A method implemented by one or more computing device processors of a computing device, the method comprising:

receiving, from a remote system and over one or more networks, a sparsified global language model, the sparsified global language model including a masked global embedding matrix, and the sparsified global language model being of a reduced size compared to an unsparsified version of the global language model, wherein the masked global embedding matrix is generated based on a global embedding mask being applied to a global embedding matrix of the unsparsified version of the global language model, and wherein the global embedding mask for the global embedding matrix is generated based on a minimum embedding size of one or more n-grams of a distribution of n-grams and/or based on a maximum embedding size of one or more other n-grams of the distribution of n-grams;

processing, using the sparsified global language model, computing device data to generate predicted output, the computing device data being stored in computing device storage of the computing device;

generating, using supervised or semi-supervised learning and based on the predicted output, an update for the global language model; and transmitting, to the remote system and over one or more of the networks, the update, wherein transmitting the update to the remote system causes the remote system to:

cause, based on the update for the sparsified global language model received from the computing device and additional updates received from additional computing devices, the global language model to be updated to generate an updated global language model.

17. A system comprising:

one or more hardware processors; and memory storing instructions that, when executed by the one or more hardware processors, cause the one or more hardware processors to:

obtain, from remote storage of the remote system, a global language model, the global language model including a global embedding matrix;

generate, using a masking technique, a global embedding mask for the global embedding matrix, wherein generating the global embedding mask for the global embedding matrix is based on a minimum embedding size of one or more n-grams of a distribution of n-grams and/or based on a maximum embedding size of one or more other n-grams of the distribution of n-grams;

apply the global embedding mask to the global embedding matrix to generate a sparsified global language model, the sparsified global language model including a masked global embedding matrix that is a masked version of the global embedding matrix;

transmit, to a population of computing device participating in a given round of decentralized learning for updating of the global language model and over one or more networks, the sparsified global language model to cause each of the computing devices to generate a corresponding update for the global language model via utilization of the sparsified global language model locally at each of the computing devices of population;

receive, from one or more of the computing devices of the population during the given round of decentralized learning and over one or more of the networks, the corresponding updates; and cause the global language model to be updated based on the corresponding updates that are received from the one or more of the computing devices of the population.

* * * * *